Aug. 18, 1925.    1,550,487
J. A. BARNES
LOCK VALVE
Filed Nov. 4, 1924
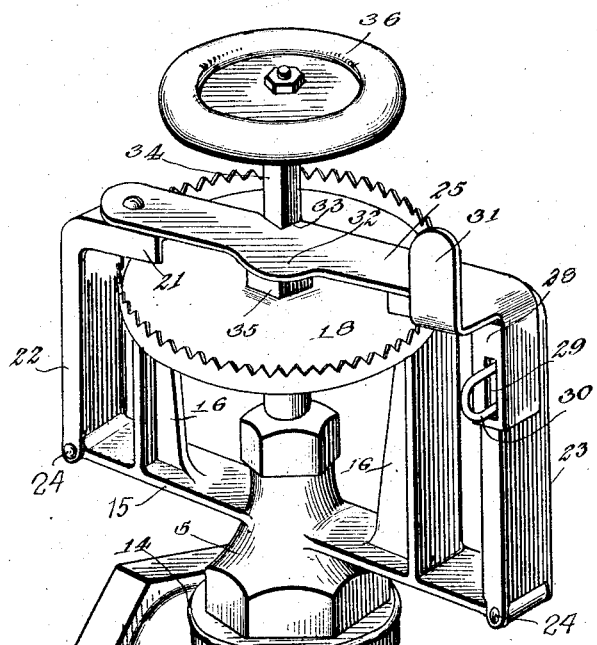
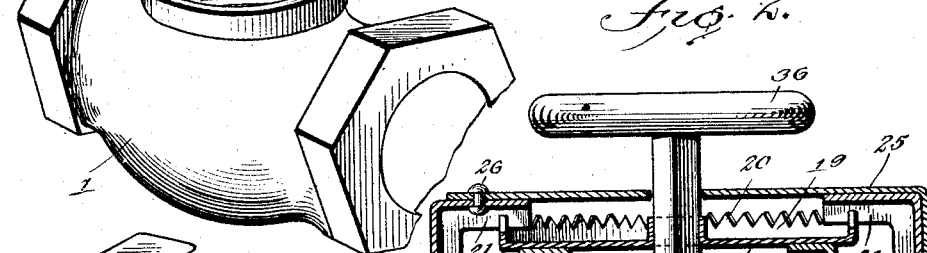
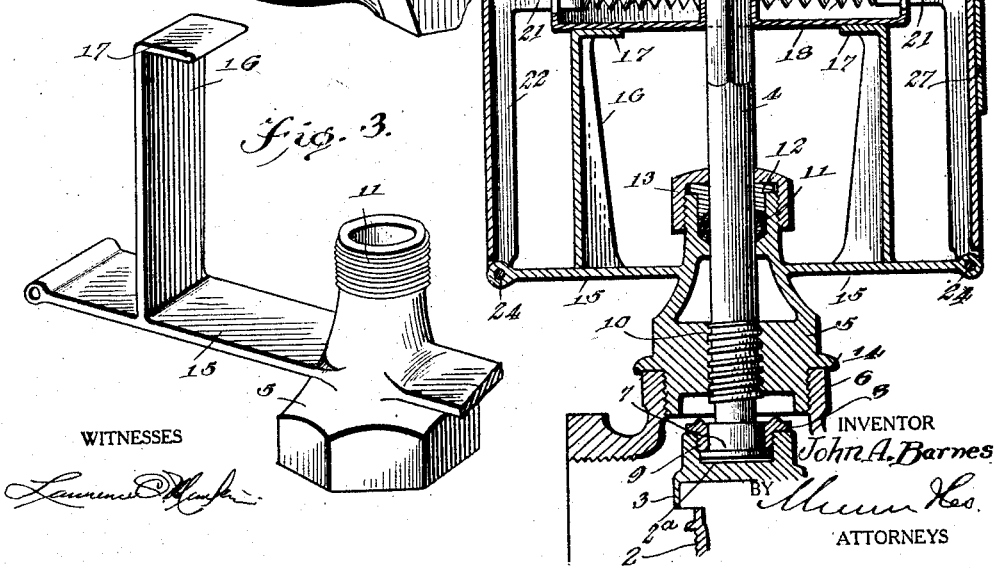
INVENTOR
John A. Barnes
ATTORNEYS Patented Aug. 18, 1925.

1,550,487

UNITED STATES PATENT OFFICE.

JOHN A. BARNES, OF BURKBURNETT, TEXAS.

LOCK VALVE.

Application filed November 4, 1924. Serial No. 747,866.

*To all whom it may concern:*

Be it known that I, JOHN A. BARNES, a citizen of the United States, and a resident of Burkburnett, in the county of Wichita and State of Texas, have invented certain new and useful Improvements in Lock Valves, of which the following is a specification.

This invention relates to locks for valves and has for its object the provision of a device for preventing unauthorized manipulation of a valve and for preventing the removal of parts of the valve so that the valve may not be operated independently of the lock.

A further object of the invention is the provision of a device for locking the stem of a valve to a packing gland threaded into the valve casing with further provision for preventing removal of the gland from the casing.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a view in perspective of the lock applied to a valve.

Figure 2 is a transverse vertical section of the lock and valve.

Figure 3 is a fragmentary view in perspective of the casting which supports the lock and valve stem.

Referring more particularly to the drawings, 1 designates a valve casing having a seat 2 with which a valve 3 is adapted to coact. The valve is carried by the stem 4 passing through a gland 5 threaded into a boss 6 formed on the casing 1.

The valve has a shoulder 7 seated in a recess 2ᵃ in the valve and adapted to be engaged by a nut 8 screwed into an internally threaded portion 9 of said recess.

The stem has a threaded portion 10 engaging complementary threads in a passage in the gland 5. The upper end of the gland is provided with a recess embracing the stem 4 and filled with a packing 11 which is held in position by a shouldered washer 12. A cap nut 13 embraces the external threads upon the upper reduced end of the gland 5 and maintains the washer 12 and packing 11 in position.

The gland 5 has an annular shoulder 14 engaging the outer end of the boss 6 and the gland is further provided with diametrically disposed arms 15 cast integrally with said gland. Standards 16 are also cast integrally with the arms 15 and project vertically upward and are provided at their upper ends with supports 17 upon which rests at diametrically opposite points a circular disc 18 having a peripheral flange 19 provided with teeth 20. These teeth are adapted to be engaged by pawls 21 projecting inwardly from pivoted arms 22 and 23. The arms 22 and 23 are pivoted as shown at 24 to the ends of an arm 15.

A hasp 25 pivoted as shown at 26 to the pawl 21 of an arm 22 extends diametrically over the disc 18 embracing the pawl 21 of the arm 23 and then bent downwardly as shown at 27 and lies in close contact with the outer face of the pivoted arm 23. The portion 27 has an inturned portion 28 provided with a slot 29 adapted to receive a hook 30 secured to or formed integrally with the arm 23. A finger piece 31 projects outwardly and upwardly from the lateral edge of the hasp 25.

The central portion of the hasp is enlarged as shown at 32 and is provided with a V-shaped notch 33 adapted to engage the two sides of the squared portion 34 of the stem 4 of the valve. The disc 18 is provided with a squared opening and an upstanding flange 35 adapted to receive the squared portion 34 and prevent rotation of the stem when the pawls 21 are engaged with the teeth of the disc 18. An operating member 36 is secured to the stem 4 whereby the valve may be rotated when desired. It will be seen from such construction that the valve 3 can only be withdrawn from its seat when the hasp 25 has been swung to its position to release the squared portion 34 of the stem 4 from the V-shaped notch 33 of the hasp 25. Ordinarily the valves when not in use are prevented from movement by a padlock engaging the hook 30 and preventing movement of the hasp 25 whereby the V-shaped notch 33 engages the square portion 34 of the valve stem.

The pawls 21 being locked against movement by the hasps 25 will prevent rotation of the disc 18 and since the squired portion of the stem 4 passes through an opening neatly embracing the stem at this point and likewise squared, the stem will be prevented from being rotated.

What I claim is:

1. In a device of the class described, a valve casing, a valve provided with a stem, a shoulder on the stem, a nut within the casing engaging the shoulder for securing the valve to the stem, said casing being provided with a boss having an internally threaded passage, a gland screwed into the passage and having the central passage adapted to receive the valve stem, a bracket formed integrally with the gland, means supported by the bracket and connected with the stem for simultaneous rotation, and means for locking the last mentioned means against rotation.

2. In a device of the class described, a valve casing, a valve provided with a stem, said casing being provided with a boss having an internally threaded passage, a gland screwed into the passage and having the central passage adapted to receive the valve stem, a bracket formed integrally with the gland, means supported by the bracket and connected with the stem for simultaneous rotation, pivoted means for locking the last mentioned means against rotation, and means for preventing operation of the last mentioned means.

3. In a device of the class described, a valve casing, a valve in said casing, means for limiting movement of the valve in the casing, a gland removably connected with the casing, a valve stem passing centrally through the gland, a bracket carried by the gland, means carried by the bracket for locking the valve stem against rotation, said means comprising a disc having a squared opening, the valve stem being provided with a squared portion adapted to be received by the squared opening in the disc, movable means engageable with the disc for preventing rotation of the disc, and means for locking the movable means against unauthorized manipulation.

4. In a device of the class described, a valve casing, a valve provided with a stem, said casing being provided with a boss having an internally threaded passage, a gland screwed into the passage and having the central passage adapted to receive the valve stem, a bracket formed integrally with the gland, means supported by the bracket and connected with the stem for simultaneous rotation, means for locking the last mentioned means against rotation, the passage in the gland where the stem passes therethrough being threaded and said stem having threads cooperating with the threads of the passage in the gland.

JOHN A. BARNES.